United States Patent [19]

Güntherberg et al.

[11] Patent Number: 5,631,323
[45] Date of Patent: May 20, 1997

[54] COMPOSITION OF STYRENE-ACRYLONITRILE COPOLYMER MATRIX WITH PARTICLES OF GRAFT COPOLYMER AND CROSSLINKED COPOLYMER

[75] Inventors: Norbert Güntherberg, Speyer; Ekkehard Jahns, Weinheim; Wolfgang Fischer, Ludwigshafen; Graham E. McKee; Bernhard Rosenau, both of Neustadt, all of Germany

[73] Assignee: BASF Aktiengesellschaft, Ludwigshafen, Germany

[21] Appl. No.: 567,056

[22] Filed: Dec. 4, 1995

[30] Foreign Application Priority Data

Dec. 9, 1994 [DE] Germany ............ 44 43 966.0

[51] Int. Cl.$^6$ ............... C08L 35/04; C08L 55/02
[52] U.S. Cl. ................ 525/71; 525/78; 525/80; 525/82; 525/83; 525/84; 525/85
[58] Field of Search ................. 525/71, 78, 80, 525/82, 83, 84, 85

[56] References Cited

U.S. PATENT DOCUMENTS

| | | | |
|---|---|---|---|
| 5,237,004 | 8/1993 | Wu et al. | 525/228 |
| 5,283,286 | 2/1994 | Takahashi et al. | 525/222 |
| 5,344,877 | 9/1994 | Fischer et al. | 525/83 |
| 5,434,218 | 7/1995 | Baumgartner et al. | 525/84 |
| 5,475,055 | 12/1995 | Deckers et al. | 525/221 |

FOREIGN PATENT DOCUMENTS

| | | |
|---|---|---|
| 269324 | 6/1988 | European Pat. Off. . |
| 576960 | 1/1994 | European Pat. Off. . |

OTHER PUBLICATIONS

CAPLUS accession No. 1974:121827 for Japanese Patent No. 48-10628, Kanegafuchi Chemical Industry Co., Ltd. Apr. 1973.

CAPLUS accession No. 1985:204871 for Japanese Patent No. 60-32811, Mltsubishi Monsanto Chemical Co. Feb. 1985.

WPAT accession No. 85-083255/14 for Japanese Patent No. 60-328111, Mitsubishi Monsanto KK. Feb. 1985.

WPIDS acession No. 95-116952[16] for European Application No. 644,210, BASF AG. Mar. 1995.

*Primary Examiner*—Robert E. Sellers
*Attorney, Agent, or Firm*—Keil & Weinkauf

[57] ABSTRACT

Thermoplastic molding materials prepared

A) from 35 to 99.5% by weight of a matrix copolymer (A) of $a_1$) from 50 to 95% by weight of styrene and/or α-methylstyrene, $a_2$) from 5 to 50% by weight of acrylonitrile and $a_3$) from 0 to 20% by weight of further comonomers B) from 0 to 50% by weight of a particulate graft copolymer (B) which is insoluble in (A), has a median particle diameter of from 0.03 to 1 μm and prepared $b_1$) from 30 to 80% by weight of a core comprising an elastomeric polymer having a glass transition temperature of less than −10° C. and $b_2$) from 20 to 70% by weight of a graft shell comprising a polymer which is compatible or partly compatible with (A)

and

C) from 0.5 to 30% by weight of a particulate crosslinked copolymer (C) which is insoluble in (A), has a median particle diameter of from 0.5 to 50 μm and comprises $c_1$) from 50 to 89.95% by weight of styrene and/or α-methylstyrene, $c_2$) from 10 to 50% by weight of acrylonitrile, $c_3$) from 0.05 to 5% by weight of a polyfunctional, crosslinking monomer, $c_4$) from 0 to 10% by weight of a monomer which contains acidic or basic groups and $c_5$) from 0 to 20% by weight of further comonomers.

6 Claims, No Drawings

COMPOSITION OF STYRENE-ACRYLONITRILE COPOLYMER MATRIX WITH PARTICLES OF GRAFT COPOLYMER AND CROSSLINKED COPOLYMER

The present invention relates to thermoplastic molding materials comprising

A) from 35 to 99.5% by weight of a matrix copolymer (A) of
- $a_1$) from 50 to 95% by weight of styrene and/or α-methylstyrene,
- $a_2$) from 5 to 50% by weight of acrylonitrile and
- $a_3$) from 0 to 20% by weight of further comonomers B) from 0 to 50% by weight of a particulate graft copolymer (B) which is insoluble in (A), has a median particle diameter of from 0.03 to 1 µm and comprises
- $b_1$) from 30 to 80% by weight of a core comprising an elastomeric polymer having a glass transition temperature of less than −10° C. and
- $b_2$) from 20 to 70% by weight of a graft shell comprising a polymer which is compatible or partly compatible with (A)

and

C) from 0.5 to 30% by weight of a particulate crosslinked copolymer (C) which is insoluble in (A), has a median particle diameter of from 0.05 to 50 µm and comprises
- $c_1$) from 50 to 89.95% by weight of styrene and/or α-methylstyrene,
- $c_2$) from 10 to 50% by weight of acrylonitrile,
- $c_3$) from 0.5 to 5% by weight of a polyfunctional, crosslinking monomer,
- $c_4$) from 0 to 10% by weight of a monomer which contains acidic or basic groups and
- $c_5$) from 0 to 20% by weight of further comonomers.

The present invention furthermore relates to the particulate copolymer (C), a process for the preparation of these copolymers and the use of the particles as dulling agents for thermoplastics, and moldings obtained from these dulled plastics.

It is generally known that the impact strength of nonresilient polymers can be improved by adding elastomeric polymers. In such blends, the nonresilient base material, which is also referred to as the matrix, forms a continuum in which the elastomeric particles are embedded in the form of discrete particles. Known examples of such blends are the ABS and ASA molding materials, in which the matrix consists of a styrene/acrylonitrile copolymer and in which crosslinked polybutadiene or polyalkyl acrylate is embedded in the matrix as an impact modifier.

In order to ensure good incorporation of the rubber particles in the matrix and hence good mechanical properties of the plastic, said particles are, as is also generally known, surrounded with a graft shell whose composition corresponds to that of the base polymer or which is compatible with the latter. In the ABS or ASA plastic, the polybutadiene particles or polyalkyl acrylate particles are grafted with a shell comprising a styrene/acrylonitrile copolymer.

In certain applications of thermoplastic, toughened polymer materials, in particular for automotive interior trim, and for household, electrical and sports appliances, an antidazzle, dull surface is increasingly being desired for decorative reasons or from the point of view of safety, for example reduced dazzling of the driver and improved performance characteristics (fingerprints are scarcely visible on dull surfaces). However, most commercial toughened molding materials give moldings having a glossy surface.

Dull moldings can be obtained by treating the surface of the finished, glossy molding, for example by mechanical toughening, such as grinding and brushing, by etching, superficial dissolution and swelling or by application of a dull coat. However, the common feature of all processes is the disadvantage of an additional operation on the finished molding.

Furthermore, compression molds and molds having a structured surface can be used for producing moldings having a dull surface, but the structure of the mold is relatively rapidly worn away.

The addition of inorganic dulling agents, such as silica gel or chalk, to polymers has the disadvantage that the mechanical properties of the moldings are adversely affected.

This adverse effect can be avoided by adding suitable organic dulling agents. They consist of particles which have a comparatively large diameter (D>about 0.5 µm) and are dispersed in the matrix polymer. The particles project from the smooth and hence glossy surface of the matrix polymer and thus give rise to diffuse reflection of the incident light (scattering), with the result that the surface appears dull to the viewer.

Dull and at the same time impact-resistant polymers are required for many applications. If a hard, brittle polymer is to be modified in this manner in one operation, the large particles imparting dullness simultaneously have elastomeric properties. In order to render the dullness-imparting rubber particles compatible or at least partly compatible with the nonresilient matrix polymer, the former are generally provided with a graft shell comprising such a compatible or partly compatible polymer.

Such elastomeric and at the same time dullness-imparting graft polymers having a large particle diameter are disclosed in EP-A 269 324. However, the process for the production of the particles is very involved. In this process, elastomeric core particles are produced in a first step and are swelled with freshly added monomer in the subsequent step, after which the polymerization is continued. This process is, if required, repeated until a desired particle size is reached, after which the graft shell is produced.

According to EP-A 576 960, another method for obtaining dull, impact-resistant molding materials is to produce larger particles by agglomeration of small particles of graft polymers which contain acidic groups in the grafting core and basic groups in the shell, or vice versa. However, there are in some cases limits to the dulling effect achievable thereby.

It is an object of the present invention to provide mixtures of toughened molding materials and dulling agents, which do not have the disadvantages of the systems known to date.

We have found that this object is achieved by the thermoplastic molding materials defined at the outset.

We have also found thermoplastic molding materials in which the monomers of which the core and/or the shell of the graft polymers (B) are composed contain acidic or basic groups. We have furthermore found molding materials which contain both graft polymers (B) modified with acidic and/or basic groups and unmodified graft polymers (B), as well as molding materials whose copolymer (C) contains acidic or basic monomers. In addition, we have found the particulate copolymers (C), a process for their preparation, the use of the component (C) as a dulling agent for thermoplastics, the use of the novel thermoplastic molding materials for the production of moldings, and moldings comprising such molding materials.

The novel molding materials contain, as component (A), from 35 to 99.5, in particular from 40 to 90, and particularly preferably from 50 to 80, % by weight, based on the sum of the components (A), (B) and (C), of a copolymer of the monomers ($a_1$) to ($a_3$). It is the matrix continuum in which the particulate components (B) and (C) are embedded. The component (A) consists of a mixture of $a_1$) from 50 to 95% by weight of styrene and/or α-methylstyrene $a_2$) from 5 to 50% by weight of acrylonitrile, and $a_3$) from 0 to 20% by weight of further comonomers.

The component (A) of the novel molding materials preferably comprises from 50 to 95, especially from 55 to 90, particularly preferably from 60 to 85, % by weight of styrene or α-methylstyrene ($a_1$), the remainder being acrylonitrile ($a_2$). Blends of two copolymers (A') und (A") in which (A') consists of a styrene/acrylonitrile copolymer and (A") consists of an α-methylstyrene/acrylonitrile copolymer are particularly suitable. Polymers in which only some of the styrene is replaced by α-methylstyrene are also suitable. Where α-methylstyrene is concomitantly used, its amount is preferably from 5 to 50% by weight of the monomer ($a_1$).

Moreover, the component (A) may be composed of the further monomers ($a_3$) at the expense of the monomers ($a_1$) and/or ($a_2$). According to laws known per se, the mechanical and thermal properties of copolymers of ($a_1$) and ($a_2$) are modified by the monomers ($a_3$) not to a substantial extent but within a certain range, and/or said monomers ($a_3$) may, for example, improve the printability of the moldings or reduce the tendency toward a buildup in electrostatic charge.

Such monomers ($a_3$) are, for example, the $C_1$- to $C_6$-alkyl esters of acrylic acid and of methacrylic acid, acrylamide, methacrylamide, methacrylonitrile, methacrylic anhydride and N-alkylated or N-arylated maleimides, such as N-methylmaleimide, N-phenylmaleimide and N-cyclohexylmaleimide.

The polymers (A), which are also referred to in general as SAN polymers owing to their main components styrene and acrylonitrile, are known and in some cases are also commercially available. They have, as a rule, a viscosity number VN (determined according to DIN 53 726 at 25° C., 0.5% strength by weight of dimethylformamide) of from 40 to 160 ml/g. They are obtained in a known manner by mass, solution, suspension, precipitation or emulsion polymerization. Details of these processes are described, for example, in Kunststoffhandbuch, Ed. R. Vieweg and G. Daumiller, vol. V Polystyrol, Carl-Hanser-Verlag Munich 1969, page 118 et seq.

The component (B) is a particulate graft polymer which is insoluble in the component (A). Accordingly, component A) is the coherent phase in which the component (B) is dispersed in the form of small particles. The amount of (B) in the thermoplastic molding material is from 0 to 50, preferably from 10 to 45, in particular from 15 to 45, % by weight, based on the sum of the components (A), (B) and (C). The graft copolymer (B) consists of $b_1$) a core comprising an elastomeric polymer having a glass transition temperature of less than $-10°$ C. and $b_2$) a graft shell comprising a polymer which is compatible or partly compatible with (A).

The amount of the grafting core ( $b_1$) in the component (B) is from 30 to 80, preferably from 40 to 75, particularly preferably from 50 to 70, % by weight, based on the amount of (B).

The elastomeric grafting core ($b_1$) preferably consists either of a partly crosslinked polymer of a 1,3-diene or of an alkyl acrylate (polyalkyl acrylate) having a glass transition temperature Tg of less than $-10°$ C., preferably less than $-20°$ C. Suitable 1,3-dienes are as a rule butadiene and substituted dienes, such as isoprene.

The acrylates used for the preparation of the polyalkyl acrylate rubbers contain as a rule from 1 to 8 carbon atoms in the alkyl radical. For example, n-butyl acrylate and 2-ethylhexyl acrylate are particularly suitable. However, the acrylates may be used alone or as a mixture.

The polymerization of the dienes can be carried out in a known manner so that crosslinked, elastomeric polymers are obtained. In the case of the elastomeric polyalkyl acrylates, on the other hand, the concomitant use of polyfunctional comonomers which affect crosslinking is necessary. Suitable monomers of this type are, for example, the divinyl and diallyl esters of dicarboxylic acids, such as those of succinic acid and adipic acid, diallyl and divinyl ethers of bifunctional alcohols, such as those of ethylene glycol and of butane-1,4-diol, diesters of acrylic and methacrylic acid with the stated bifunctional alcohols, 1,4-divinylbenzene and triallyl cyanurate. The acrylate of tricyclodecenyl alcohol

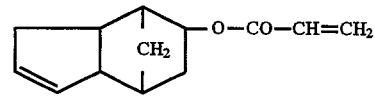

or

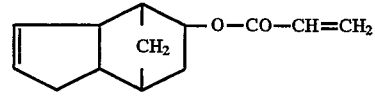

which is also referred to as dihydrodicyclopentadienyl acrylate, is particularly preferred.

The crosslinking monomers are usually used in amounts of from 0.1 to 10, preferably from 0.2 to 5, % by weight, based on the total amount of the component ($b_1$).

The preparation of the polybutadiene and polyalkyl acrylate rubber particles ($b_1$) is generally known. As a rule, the monomers are polymerized in aqueous emulsion at from 20° to 100° C., preferably from 50° to 80° C., and all components of the batch may be combined (batch process) or the monomer alone or an emulsion of monomer, water and emulsifier can be gradually added to the other components (monomer feed or emulsion feed process). A continuous reaction procedure is also possible. One of the feed processes is preferred. The usual emulsifiers, such as alkali metal salts of alkanesulfonic or alkylarylsulfonic acids, alkylsulfates, fatty alcohol sulfates, salts of higher fatty acids of 10 to 30 carbon atoms or resin soaps, may be used. Their amount is preferably from 0.5 to 5% by weight, based on the total amount of the core monomers ($b_1$).

Suitable polymerization initiators are free radical formers, in particular water-soluble peroxides, such as peroxosulfates, eg. potassium peroxodisulfate or ammonium peroxodisulfate. However, redox systems, in particular those based on hydroperoxides, such as cumyl hydroperoxide, may also be used. The amount of the initiators is as a rule from 0.1 to 2% by weight.

Furthermore, molecular weight regulators, such as ethylhexyl thioglycolate and tert-dodecyl mercaptan, or terpinols and dimeric α-methylstyrene are also advantageously used, in the amounts usual for this purpose. In most cases, buffer substances, such as sodium bicarbonate, sodium pyrophosphate or sodium salts of orthophosphoric acid, are also used in order to establish an essentially constant pH of, preferably, 6–9.

For the preparation of the emulsion, water is preferably used in an amount such that the prepared emulsion has a solids content of from 20 to 50% by weight.

Detailed descriptions of the preparation of the rubber latices appear, for example, in DE-A 24 27 960 and EP-A 62 901.

The exact polymerization conditions, in particular the type, dose and amount of the emulsifier, are chosen specifically within the abovementioned ranges so that the resulting latex of the polymer ($b_1$) has a $d_{50}$ value of from about 0.03 to 1 μm, preferably from 0.05 to 0.8 μm. If the polymer particles are smaller, they may also be agglomerated to give larger particles, for example with the aid of hydrophilic polymers, as described in detail in DE-A 24 27 960.

The graft shell ($b_2$) is present in the component (B) in amounts of from 20 to 70, preferably from 25 to 60, particularly preferably from 30 to 50, % by weight, based on the amount of the component (B). The shell acts as a compatibilizer between the matrix copolymer (A) and the rubber cores ($b_1$) embedded therein.

All monomers or monomer mixtures which give polymers which are compatible or partly compatible with the copolymer matrix (A) and which can be grafted onto the elastomeric cores are suitable for the synthesis of the shell ($b_2$). If, for example, the matrix (A) consists completely or predominantly of a styrene/acrylonitrile copolymer (SAN) or an α-methylstyrene/acrylonitrile copolymer, styrene and/or α-methylstyrene and acrylonitrile are also the preferred monomers for the polymerization of the shell ($b_2$). However, it is also possible to use other monomers, for example methyl methacrylate and methacrylonitrile.

Compatibility is understood as meaning the miscibility at the molecular level. One polymer is considered to be compatible with another one if the molecules of the two polymers are randomly distributed in the solid state, ie. if the concentration of one polymer neither increases nor decreases along any vector. Conversely, incompatibility occurs if two phases which are separated from one another by a sharp phase boundary are formed in the solid state. Along a vector intersecting the phase boundary, the concentration of one polymer increases abruptly from zero to 100% and that of the other decreases from 100% to zero.

Between the two extremes, there are fluid transitions. Their typical feature is that a phase boundary is formed but is ill defined. Mutual partial penetration of the two phases occurs at the phase boundary. Accordingly, along a vector intersecting the phase boundary, the concentration of one polymer increases more or less rapidly from zero to 100% and that of the other polymer decreases more or less rapidly from 100% to zero.

In this latter case, the term partial compatibility is also used, as frequently occurs in industrially important polymers. The grafting of the shells comprising the monomers ($b_2$) onto the elastomeric cores ($b_1$) is carried out in a manner known per se, as a rule by continuing the emulsion polymerization. If two or more monomers are used, they may be added to the latex either simultaneously or in succession, and in the last-mentioned case grafts having a multi-shell structure may be obtained.

Grafting is advantageously effected at from 20° to 100° C., preferably from 50° to 80° C. The same water-soluble compounds which are used in the polymerization of the core can be employed as polymerization initiators. It is also possible to use initiators which are oil-soluble or soluble in the monomer, for example dialkyl peroxides, such as dilauryl peroxide, dibenzoyl peroxide, peresters, such as tert-butyl perpivalate and tert-butyl peroxyneodecanoate, and diperoxyketals, peroxycarbonates and azo compounds, such as azobisisobutyronitrile (AIBN) and azobisisovaleronitrile (ABVN).

Details for carrying out the grafting reaction are described, for example, in DE-A 24 27 960 and EP-A 62 901.

Graft polymers (B) which are particularly suitable for the novel molding materials are those whose core contains acidic or basic groups and whose shell contains complementary basic or acidic groups. These functional groups are introduced via corresponding comonomers, the amount of which in the core or shell is from 0.5 to 10, preferably from 1 to 5, % by weight.

Such graft polymers modified with acid or base groups and conventional graft polymers which are not acid- or base-modified may be present simultaneously in the thermoplastic molding materials. The amount of the acid- or base-containing graft particles in component (B) is from 2 to 30, preferably from 3 to 25, particularly preferably from 5 to 20, % by weight, based on the total amount of (B); the remaining amount comprises unmodified graft polymer. The amount of the acidic or basic graft polymers is preferably from 2 to 25, particularly preferably from 2 to 10, % by weight, based on the sum of the components A), B) and C).

Comonomers having acidic groups, especially carboxyl and also the sulfo and phosphonic acid group, are primarily acrylic acid and methacrylic acid, as well as citraconic acid, crotonic acid, fumaric acid, itaconic acid, maleic acid (and maleic anhydride), vinylsulfonic acid, vinylbenzenesulfonic acid, vinylphosphonic acid and cinnamic acid.

Particularly suitable basic monomers are those which contain a tertiary amino group or a nitrogen-containing heterocyclic structure in the molecule. Dimethylaminoethyl acrylate and methacrylate are preferred; other suitable monomers are, for example, morpholine methacrylate, N-vinylimidazole, p-dimethylaminostyrene, N-vinylcarbazole, N-vinylindole, N-vinylpyrrole, 4-vinylpyrimidine, 2-vinylpyridine, 3-vinylpyridine, 4-vinylpyridine, hydroxyethyl acrylate and hydroxyethyl methacrylate and mixtures thereof.

It is assumed that the functionalization of the graft polymer particles with acidic or basic groups results in agglomeration of these particles to give larger particles. In contrast to the unagglomerated smaller particles, the larger particles are capable of scattering light and hence result in the surface of the molding appearing dull to the viewer (cf. EP-A 576960).

The dulling effect achieved by the acidic or base modification of the elastomeric graft particles may be desirable in addition to the dulling achieved by hard particles having a large diameter. The use of graft particles functionalized with acidic or basic groups together with such large particles having a dulling effect leads to particularly reflectionless, silk-matt molding surfaces since the graft particles dull the base between the protuberances produced by the large hard particles.

The component (C) is a particulate crosslinked copolymer which is insoluble in the component (A) and has a large particle diameter. The copolymer (C) is present in the novel thermoplastic molding material in an amount of from 0.5 to 30, preferably from 1 to 20, particularly preferably from 2 to 10, % by weight. It is consists of $c_1$) from 50 to 89.45, preferably from 45 to 80, particularly preferably from 50 to 78, % by weight of styrene and/or α-methylstyrene, $c_2$) from 10 to 50, preferably from 15 to 45, particularly preferably from 18 to 40, % by weight of acrylonitrile, $c_3$) from 0.05 to 5, preferably from 0.1 to 4, particularly preferably from 0.5 to 3, % by weight of a polyfunctional, crosslinking monomer, $c_4$) from 0 to 10, preferably from 0 to 8, particularly preferably from 0 to 5, % by weight of a monomer which contains acidic or basic groups, and $c_5$) from 0 to 20, preferably from 0 to 15, particularly preferably from 0 to 10, % by weight of further comonomers.

Examples of suitable crosslinking monomers ($c_3$) are compounds such as those stated as crosslinking agents for the elastomeric grafting cores ($b_1$)- In particular, they render the particle of the copolymer (C) insoluble in the matrix-forming component (A).

The component (C) may furthermore contain comonomers ($c_4$) which carry acidic or basic groups. Suitable monomers of this type are those as stated in connection with the preferred graft polymers (B).

Polymers (C) modified with acidic or basic groups may be advantageous in particular when the graft polymers (B) also contain complementary acidic and basic groups in core and shell, as described above.

Some or all, preferably from 75 to 98% by weight, of the monomers ($c_1$) and ($c_2$) may be replaced by methyl methacrylate. In this case, too, acidic or basic monomers ($c_4$) may be present in the particles (C).

With regard to the optional comonomers ($c_5$), the statements made in connection with the optional comonomers ($a_3$) for the synthesis of component (A) are applicable. If some or all of the monomers ($c_1$) and ($c_2$) are replaced by methyl methacrylate, the component ($c_5$) consists of $C_1$–$C_{10}$-alkyl acrylates, preferably methyl acrylate or ethyl acrylate.

The novel crosslinked particulate copolymers (C) have a median particle size d50 of from 0.5 to 50 µm, in particular from 0.8 to 40 µm, particularly preferably from 1 to 30 µm. Accordingly, they are considerably larger than the graft polymer particles (B).

The particles (C) are obtained by the microsuspension polymerization process, in which the monomer mixture is dispersed in water in the presence of a protective colloid with thorough stirring, ie. with high shear force. Stirrers which are operated at peripheral velocities of from 10 to 25 m/s or other dispersers are usually used for this purpose. Once the droplets have reached the desired size, the polymerization is carried out with moderate stirring at peripheral velocities of less than 3 m/s by the addition of a free radical initiator and, as a rule, at from 40° to 130° C.

Examples of suitable protective colloids are cellulose derivatives, such as carboxymethylcellulose, hydroxymethylcellulose, poly-N-vinylpyrrolidone, polyvinyl alcohol and polyethylene oxide, anionic polymers, such as polyacrylic acid, and cationic ones, such as poly-N-vinylimidazole, in concentrations of, preferably, from 0.02 to 1% by weight of the total mass of the emulsion.

Particularly good results are obtained if, in addition to the protective colloids, colloidal silica is concomitantly used in a concentration of, as a rule, from 0.2 to 5% by weight, based on the amount of the emulsion. Further details of this method, which can be carried out particularly readily with a water-soluble polymer of adipic acid and diethanolamine as protective colloid, are described in U.S. Pat. No. 3,615,972.

A water-soluble inhibitor which suppresses the emulsion polymerization is advantageously concomitantly used to inhibit, in the microsuspension polymerization, the simultaneous emulsion polymerization process in which substantially smaller particles which are therefore unsuitable for imparting dullness are formed. Effective compounds of this type are, for example, chromium(+6) compounds, such as potassium dichromate.

The microsuspension polymerization is preferably carried out at a pH of from 3 to 9.

The oil-soluble or monomer-soluble free radical initiators, in particular peroxides and azo compounds, as stated for the preparation of the component B, may be used as polymerization initiators. Their amount is as a rule from 0.1 to 3% by weight, based on the total amount of the monomers ($c_1$) to ($c_5$).

The polymerization of the monomers takes place at from 20° to 150° C., preferably from 40° to 130° C. The lower limits of these ranges correspond as a rule to the decomposition temperature of the initiator used. The amount of water is preferably from 40 to 70% by weight of the total amount of the emulsion.

The toughened thermoplastic molding materials ABS or ASA formed on mixing the hard matrix copolymers (component (A)) and the very finely divided elastomeric graft polymers (component (B)) can be dulled with the particles of larger diameter (component (C)) while retaining the mechanical properties. In particular, the impact strength of the novel molding materials is equivalent to that of the conventional polymers having glossy surfaces. The deterioration of the mechanical properties which is to be observed with the concomitant use of conventional dulling agents, such as chalk or silica gel, does not occur.

Moreover, the novel molding materials and the moldings produced therefrom have the advantages of improved printability and antiblocking properties, ie.the surfaces of the moldings which are roughened by the particles do not adhere to one another. This effect due to adhesion is known, for example, in the case of plastics films. Novel films containing particles and placed one on top of the other to form a stack can be readily separated from one another, in contrast to films which do not contain such particles.

The molding materials may furthermore contain additives of all types. Examples are lubricants and mold release agents, pigments, flameproofing agents, dies, stabilizers, fibrous and pulverulent fillers and reinforcing agents and antistatic agents, each of which are added in the conventional amounts.

The novel molding materials can be prepared by a conventional mixing method, for example by incorporating the particulate graft polymer in the base material at above the melting point of the base material, in particular at from 180° to 300° C., in a conventional mixing apparatus (kneader, extruder or mixer). The novel molding materials can be converted into moldings having reduced surface gloss (dullness) and high impact strength.

EXAMPLES

The stated median particle size d is the weight average particle size as determined by means of an analytical ultracentrifuge according to the method of W. Scholtan and H. Lange, Colloid-Z. und Z.-Polymere 250 (1972), 782–796. The ultracentrifuge measurement gives the integral mass distribution of the particle diameter of a sample. From this it is possible to determine the percentage by weight of the particles which have a diameter equal to or smaller than a certain size.

The $d_{10}$ value gives the particle diameter at which 10% by weight of all particles have a smaller diameter and 90% by weight have a larger diameter. Conversely, for the $d_{90}$ value, 90% by weight of all particles have a smaller diameter than the diameter which corresponds to the $d_{90}$ value, and 10% by weight have a larger diameter. The $d_{10}$, $d_{50}$ and $d_{90}$ values characterize the width of the particle size distribution. The volume average particle diameter D gives the particle diameter at which 50% by weight of all particles have a larger particle diameter and 50% by volume have a smaller particle diameter.

The following components were prepared or provided for the Examples below (stated percentages are % by weight):

A: Hard, thermoplastic SAN copolymer (matrix) A copolymer of 65% by weight of styrene and 35% by weight of acrylonitrile was prepared by the continuous solution polymerization method, as described in Kunststoff-Handbuch, Ed R. Vieweg and G. Danmiller, Vol. V Polystyrol, Carl-Hanser-Verlag Munich 1969, pages 122–124. The viscosity number VN (determined according to DIN 53 726 at 25° C., 0.5% strength by weight in dimethylformamide) was 80 ml/g.

B: Elastomeric graft polymer

B-1: Conventional graft polymer (polybutadiene rubber), type: butadiene (core)/styrene+acrylonitrile (shell).

A polybutadiene latex was prepared by polymerizing 600 g of butadiene up to a conversion of 98% in the presence of a solution of 6 g of tert-dodecyl mercaptan, 7 g of a sodium $C_{14}$-alkanesulfonate as an emulsifier, 2 g of potassium peroxodisulfate and 2 g of sodium pyrosulfate in 800 g of water at 65° C. The median particle size was 100 nm.

The latex was agglomerated by adding 250 g of an emulsion of a copolymer of 96% by weight of ethyl acrylate and 4% by weight of methacrylamide having a solids content of 10%, the resulting median particle size being 350 nm.

After the addition of 400 g of water, 4 g of sodium $C_{14}$-alkanesulfonate and 2 g of potassium peroxodisulfate, 400 g of a mixture of 70% by weight of styrene and 30% by weight of acrylonitrile were added in the couse of 4 hours and the batch was kept at 75° C. while stirring. The conversion, based on styrene/acrylonitrile, was virtually quantitative. The graft rubber emulsion obtained was precipitated and dewatered by means of aqueous magnesium sulfate solution.

B-2: Modified graft polymer (polybutyl acrylate rubber), acid-modified core, base-modified shell. Type: n-butyl acrylate (core), modified with methacrylic acid as the monomer containing acidic groups/styrene+ acrylonitrile (shell), modified with N,N-dimethylaminoethyl acrylate as the monomer containing basic groups.

160 g of a mixture I consisting of 96% by weight of n-butyl acrylate, 2% by weight of dihydrodicyclopentadienyl acrylate and 2% by weight of methacrylic acid in 150 g of water were heated to 60° C. with the addition of 5 g of sodium salt over $C_{12}$–$C_{18}$-paraffinsulfonic acid, 3 g of potassium peroxodisulfate, 3 g of sodium bicarbonate and 1.5 g of sodium pyrophosphate, while stirring. 10 minutes after initiation of the polymerization reaction, a further 840 g of the mixture I were added in the course of 3 hours, after which the mixture was kept at 60° C. for a further hour. The conversion was 99% and the median particle size was 0.1 μm.

2100 g of this emulsion were mixed with 1150 g of water and 2.7 g of potassium peroxodisulfate and heated to 65° C. while stirring. Thereafter, 560 g of a monomer mixture comprising 73% by weight of styrene, 23% by weight of acrylonitrile and 4% by weight of N,N-dimethylaminoethyl acrylate were metered in over 3 hours, after which the emulsion was kept at 65° C. for a further 2 hours. The graft polymer was precipitated from the emulsion by means of calcium chloride solution at 95° C., washed with water and dried in a warm air current. The conversion was 99.7%.

C: Hard copolymer having a large diameter

C-1: SAN copolymer particles, crosslinked 1120 g of water, 200 g of an aqueous alkaline colloidal silica dispersion (30% of $SiO_2$, pH 9.8, particle diameter 12 nm; Ludox® HS 30 from DuPont) as protective colloid, 30 g of a 10% strength aqueous solution of a copolymer of 50% of adipic acid and 50% of diethanolamine, as a water-soluble polymer, and 12 g of a 2.5% strength aqueous potassium dichromate solution as a further assistant were combined under nitrogen and brought to a pH of 6.0 with 10% strength aqueous hydrochloric acid. A mixture of

| 900 | g of styrene | as monomers, |
|---|---|---|
| 300 | g of acrylonitrile | |

1.2 g of the diester of ethylene glycol with methacrylic acid (ethylene glycol dimethacrylate) as a crosslinking agent and 6 g of benzoyl peroxide as initiator were added. Dispersing was then carried out for 25 minutes using a high-speed stirrer (dissolver stirrer, 4500 rpm, 5 cm toothed disc), and the pH was reduced to 4.0 with the stated HCl during this procedure. Monomer droplets having a median diameter of from 2 to 7 μm, determined by optical microscopy, were formed. The emulsion was transferred to another kettle and heated there to 85° C. in the course of 5 hours with moderate stirring, the styrene/acrylonitrile copolymer being formed. The conversion was about 98%.

The copolymer particles obtained had a median particle diameter $d_{10}$ of 0.31 μm, a $d_{50}$ of 1.72 μm and a $d_{90}$ of 5.98 μm. The volume average diameter D was 2.67 μm, determined using a Malvern Master Sizer apparatus.

C-2: Methyl methacrylate polymer particles having a large diameter

Type: methyl methacrylate+methacrylic acid, crosslinked with butanediol dimethacrylate.

A mixture of 1300 g of water, 12 g of a solution of a copolymer of 65% by weight of methacrylic acid and 35% by weight of methyl methacrylate, having a copolymer content of 1.6% by weight and neutralized with NaOH to pH 7, 400 g of a partly hydrolyzed polyvinyl acetate solution, having a content of 10% by weight (Mowiol® 40–88 from Hoechst AG), as an emulsifier, 873 g of methyl methacrylate, 8 g of methyl acrylate, 27 g of butanediol dimethacrylate as a crosslinking agent, 0,15 g of tert-butyl perpivalate, 0.58 g of dilauroyl peroxide, 0.29 g of t-butyl peroxyneodecanoate and 4.5 g of tert-dodecyl mercaptan as a regulator were subjected to very fine dispersing for 30 minutes (dispenser stirrer with 5 cm toothed disc, 3500 rpm) and then heated to 67° C. After the emulsion had been transferred to another kettle with moderate stirring (anchor stirrer, 150 rpm), the mixture was kept at this temperature for 2.5 hours, then at 75° C. for one hour and at 85° C. for one hour, after which the resulting emulsion was precipitated by coagulation by freezing, dewatered and dried.

The emulsion had a solids content of 34%. The particle size was from 1 to 18 μm, determined using a Malvern Master Sizer apparatus, the predominant proportion of the particles having a diameter of from 2 to 6 μm.

The components (A), (B) and (C) were thoroughly mixed in a conventional extruder (ZSK 30, Werner and Pfleiderer) at 250° C. in accordance with the ratios given in Table 1, extruded and granulated. The granules were injection molded at a melt temperature of 250° C. and a mold temperature of 60° C. to give standard small bars (cf. DIN 53453). Furthermore, circular discs having a diameter of 7 cm and a thickness of 0.2 cm were injection molded at mold temperatures of 30° C. and 60° C. The properties of the moldings were investigated.

The Table summarizes the mixing ratios in the polymer blends and the properties of the moldings produced therefrom.

| Experiment No. | 1V | 1 | 2V | 2 | 3V | 3 |
|---|---|---|---|---|---|---|
| Composition of the blends [%]: | | | | | | |
| A = Matrix SAN | 78 | 68 | 70 | 65 | 73 | 65 |
| B-1 = Bu-g-SAN | 22 | 22 | 20 | 20 | 22 | 20 |
| B-2 = BA(s)-g-SAN(b) | 0 | 0 | 10 | 10 | 0 | 10 |
| C-1 = SAN particles | 0 | 10 | 0 | 5 | 0 | 0 |
| C-2 = MMA particles | 0 | 0 | 0 | 0 | 5 | 5 |
| Properties | | | | | | |
| Notched impact strength [Nm] | 11 | 12 | 15 | 15 | 6 | 9 |
| Multiaxial impact strength [Nm] | 12 | 11 | 15 | 22 | 3 | 6 |
| Light reflection [%] at | | | | | | |
| Mold temperature 30° C. | 68 | 14 | 17 | 12 | 33 | 18 |
| Mold temperature 60° C. | n.d. | 22 | 24 | 19 | n.d. | n.d. |

SAN: Styrene/acrylonitrile copolymer
Bu: Polybutadiene
BA: Poly-n-butyl acrylate
MMA: Polymethyl methacrylate, crosslinked
g: Grafting
(s): modified with acidic groups
(b): modified with basic groups
n.d.: not determined The light reflection by a molding comprising styrene/acrylonitrile copolymer (component A) which is toughened with SAN-grafted polybutadiene (B-1) is considerably reduced by the concomitant use of the novel SAN particles having a large diameter (C-1) (experiment No. 1V and 1).

If, instead of the novel SAN particles (C-1), graft polymers which have a conventional diameter and consist of a polybutyl acrylate modified with acidic groups and grafted with a shell (B-2) modified by basic groups are used, a substantial dulling effect is likewise achieved, as disclosed in EP-A 576 960 (experiment 2V). If, on the other hand, a combination of the two dulling agents is used (acid/basic-modified, SAN-grafted polybutyl acrylate particles having a conventional size (B-2) together with novel SAN particles having a large diameter (C-1)) a further reduction in light reflection is found (experiment 2).

If particles having a large diameter and comprising crosslinked polymethyl methacrylate (C-2) are added to the SAN copolymer (A) toughened with polybutadiene (B-1), dull molding surfaces are also obtained, as disclosed in EP-A 582 951 (experiment 3V). When these large PMMA particles (C-2) are used in combination with acid/base-modified SAN-grafted polybutyl acrylate particles of normal size (B-2), a further considerable decrease in light reflection is observed (experiment 3).

A comparison of the novel Examples 1, 2 and 3 with their corresponding comparative experiments 1V, 2V and 3V show that the desired dulling effect is achieved while fully retaining the mechanical properties (notched impact strength and multiaxial impact strength).

We claim:

1. A thermoplastic molding material comprising

A) from 35 to 99.5% by weight of a matrix copolymer (A) of $a_1$) from 50 to 95% by weight of styrene or α-methylstyrene or a mixture thereof, $a_2$) from 5 to 50% by weight of acrylonitrile and $a_3$) from 0 to 20% by weight of further comonomers B) from 0 to 50% by weight of a particulate graft copolymer (B) which is insoluble in (A), has a median particle diameter of from 0.03 to 1 μm and comprises $b_1$) from 30 to 80% by weight of a core comprising an elastomeric polymer having a glass transition temperature of less than −10° C. and $b_2$) from 20 to 70% by weight of a graft shell comprising a polymer which is compatible or partly compatible with (A)

and

C) from 0.5 to 30% by weight of a particulate crosslinked copolymer (C) which is insoluble in (A), has a median particle diameter of from 0.5 to 50 μm and comprises $c_1$) from 50 to 89.95% by weight of styrene or α-methylstyrene or a mixture thereof, $c_2$) from 10 to 50% by weight of acrylonitrile, $c_3$) from 0.05 to 5% by weight of a polyfunctional, crosslinking monomer, $c_4$) from 0 to 10% by weight of a monomer which contains acidic or basic groups and $c_5$) from 0 to 20% by weight of further comonomers.

2. A thermoplastic molding material as defined in claim 1, in which from 0.5 to 10% by weight of the core polymer ($b_1$) of the graft polymer (B) is composed of monomers which contain acidic or basic groups and from 0.5 to 10% by weight of the graft shell ($b_2$) is composed of monomers having basic groups if acidic groups are present in ($b_1$) or of monomers having acidic groups if basic groups are present in ($b_1$).

3. A thermoplastic molding material as defined in claim 1, in which from 2 to 30% by weight of the component (B) consists of a graft copolymer as defined in claim 2 and the remainder consists of a graft copolymer which contains no acidic or basic groups.

4. A thermoplastic molding material as defined in claim 1, which contains a component (B) as defined in claim 2 and a copolymer (C) which is composed of from 0.1 to 10% by weight of monomers having acidic or basic groups as comonomers ($c_4$).

5. A thermoplastic molding material as defined in claim 1, in which the copolymer (C) is composed of the monomers ($c_1$) to ($c_5$), where the monomers ($c_1$) and ($c_2$) may be replaced by methyl methacrylate and the monomer ($c_5$) may be a $C_1$- to $C_{10}$-alkyl acrylate.

6. A molding formed from a thermoplastic molding material as defined in claim 1.

* * * * *